United States Patent Office 3,304,262
Patented Feb. 14, 1967

3,304,262
CLEANSING COMPOSITION AND METHOD OF MANUFACTURE THEREOF
Garland George Corey, Milltown, N.J., assignor to Colgate-Palmolive Company, New York, N.Y., a corporation of Delaware
No Drawing. Filed June 1, 1964, Ser. No. 371,752
5 Claims. (Cl. 252—122)

The present invention relates to cleansing compositions. More particularly, this invention has to do with an improved cleansing composition in the form of a stable, gelated oil-in-water emulsion, and to a method of making the cleansing composition as herein after described.

Cleansing compositions known as the so-called waterless hand cleansers have been marketed for years in paste or gel form. An almost myriad of emulsions of various characteristics have been known in the past and are charterized by their non-fluidity in the at rest or standing state and by their liquefaction of fluidity as promoted by frictional heat and mechanical working. However, stability has been and remains today a primary problem with such compositions. Since conditions to which these compositions are exposed can vary from low temperature storage, such as below 0° C., to storage at elevated temperatures, such as 50° C., as well as cyclic temperature changes of wide range and exposure to the atmosphere, it is readily understood that when emulsions are subjected to these conditions their properties can be altered such that separation of one or more components of the emulsion takes place. These products are especially susceptible to "liquefying" when exposed to the atmosphere. By virtue of the present invention, such instability is lessened or obviated.

In accordance with the present invention, a stable, gelated oil-in-water emulsion cleansing composition comprises, by weight of the composition, about 20% to about 50% of odorless mineral spirits, about 40% to about 60% of water, about 5% to 15% of a condensate of an aliphatic alcohol with about 4 to 12 mols of ethylene oxide, said aliphatic alcohol containing from about 12 to 20 carbon atoms, about 0.1 to 10% of a hydrophilic-hydrophobic polyoxyalkylene polyoxypropylene glycol of the formula $$HO(C_2H_4O)_m(C_3H_6O)_n(C_2H_4O)_m \cdot H$$

in which the molecular weight of the group $(C_3H_6O)_n$ is from the range of 1750 to 3500 and $(C_2H_4O)_m$ equals 20% to 50% of the total weight of the compound, and about 3% to 14% of higher fatty acid calculated as soap sufficient to gel the ingredients, said ingredients being proportioned to form a stable gelated oil-in-water emulsion having a pH from about 7 to about 9.

The compositions of the present invention are characterized by the formation of a stable, gelated oil-in-water emulsion. There is obtained a firm, smooth gel wherein the gel structure does not breakdown to a liquefied emulsion or form any substantial free liquid upon aging so as to produce a superior product of desirable stability for the consumer. Compositions can be made in accordance with the present invention which are stable and without any substantial free liquid formation after aging under such test conditions as about 6 months at room temperature, about 5 to 8 days at 120° F., about 5 to 8 days at 130° F., or after exposure to open air for about 24 hours, or after 3 freeze/thaw cycles where the compositions are subjected to a temperature of about 5° F. and thereafter thawed at room temperature, or the like. Thus, in normal storage and even when exposed to the atmosphere the instant compositions do not have undersirable amounts of free liquids above the surface of the gel upon aging so as to obtain satisfactory shelf life.

While the compositions of the present invention are in the form of firm, stable gelated products, the formulation of the products is such that in the application and use for cleansing the hands or skin the heat of the body and the frictional heat and mechanical working coact to readily break the gel. Accordingly, the product liquefies during rubbing without any difficulty and has improved liquid epidermis contact. After using the product, one may either wipe off the contacted area to remove grease and grime or wash with water.

The pH of the composition of the present invention for use on the hands and skin generally ranges from about 7 to 9 with particular preference being given to the range of about 7.8 to 8.3, as determined on the gel. With a pH of about 7 to 9, the gelated product will break readily when applied to the hands whereas at a significantly higher pH the gel is difficult to break and at a significantly lower pH the gel is not stable.

The cleansing compositions of the present invention contain as an essential ingredient a condensate of an aliphatic alcohol with about 4 to 12 mols, preferably an average of 8–10 mols, of ethylene oxide, the aliphatic alcohol containing from about 12 to 20 carbon atoms, preferably 14 to 18 carbons. Preferably the aliphatic alcohol-ethylene oxide condensate contains a mixture of saturated, straight chain aliphatic alcohols of essentially 14 to 18 carbons such as having an approximate distribution (by weight) of:

| | Percent |
|---|---|
| $C_{12}$ | 3 max. |
| $C_{14}$ | 37±3 |
| $C_{16}$ | 37±3 |
| $C_{18}$ | 21±2 |
| $C_{20}$ | 2 max. | and an average of about 9 ethylene oxide groups per molecule. Other suitable aliphatic oxyethylated alcohols are the reaction products of aliphatic alcohols having 12 to 20 carbon atoms such an n-dodecyl alcohol, tridecyl alcohol, tetradecyl alcohol, tallow alcohol with an average of 8, 9 and 10 mols of ethylene oxide with each of said alcohols. In addition to its emulsification effects in combination with the other ingredients for providing the oil-in-water emulsion of the final composition, the aliphatic oxyethylated alcohol component of the instant cleansing composition serves as a gelation adjusting agent and influences the formation of stable, gelated oil-in-water emulsions also. Other nonionics such as the ethylene oxide condensation products of alkyl phenol have been used as emulsifying agents but they are not effective in the present invention.

Another constituent of the instant compositions is a hydrophilic-hydrophobic polyoxyalkylene polyoxypropylene glycol selected from a group of compounds known commercially as "Pluronics." In general, these products are groups of conjugated polyoxypropylene-polyoxyethylene compounds prepared by condensing propylene oxide with a relatively low molecular weight organic compound containing one or more reactive hydrogen atoms to prepare a hydrophobic polyoxypropylene polymer having a molecular weight of at least about 800. The hydrophobic polyoxypropylene polymer is then converted into a surface active agent by condensing ethylene oxide therewith in an amount such that the oxyethylene groups constitute 20–90%, by weight, of the final product. These polyoxypropylene polyoxyethylene polymers have the following generic formula $$HO(C_2H_4O)_m(C_3H_6O)_n(C_2H_4O)_m \cdot H$$

where $m$ has a value such that the $(C_2H_4O)$ groups constitute 20 to 90%, by weight, of the compound; and $n$ is a whole number.

Not all of the "Pluronics" are suitable for use in accordance with the present invention and for the purpose of the present invention it is to be understood that compounds suitable for use are those, with reference to the above generic formula, wherein the $(C_3H_6O)_n$ group has a molecular weight from the range of about 1750 to 3500, preferably about 2300 to 3500, and the $(C_2H_4O)_m$ groups constitute from about 20% to 50% and preferably 30 to 50% of the total weight of the compound. Exemplary "Pluronics" that can be used include L64, L84, L92, L94, L103, L104 and L105. The following are examples of suitable materials:

TABLE I

| Compound | $(C_3H_6O)_n$ Group (Typical Molecular Weight) | $(C_2H_4O)_m$ Groups |
|---|---|---|
| A | 1,750 | 40% |
| B | 2,250 | 40% |
| C | 2,750 | 20% |
| D | 2,750 | 40% |
| E | 3,250 | 30% |
| F | 3,250 | 40% |
| G | 3,250 | 50% |

In the compositions of the present invention, the above-described materials have been found to serve as a stabilizing agent, particularly in combination with the other ingredients. They modify the gel characteristics of the product to render it more stable toward chemical and physical deterioration on aging and tend to prevent the gel from liquefying prior to use even when the product container is left opened, e.g. over a 24 hour period of time.

The cleansing composition of the present invention contains an alkane petroleum distillate type solvent known in the art as "odorless mineral spirits." These odorless mineral spirits are clear water-like liquids having relatively low viscosity and having solvency characteristics particularly suitable for cleansing compositions of the present invention. The flashpoint (closed cup) is usually about 100° F. minimum and the normal distillation range runs from about 300° F. to 410° F., preferably 340–410° F. for such aliphatic hydrocarbon materials. They function effectively to loosen dirt and grime in the cleansing action of the present products. These materials are considered the oil component in the oil phase of the gelated emulsion.

It has also been found that a minor amount, e.g. up to 50% by weight, of the odorless mineral spirits can be replaced by mineral oil, e.g. white mineral oil and light white mineral oil. Where employed, the mineral oil is preferably up to about 10% of the entire composition. Accordingly, the term oil component as used herein includes odorless mineral spirits and a minor amount of mineral oil.

The cleansing composition of the present invention also contains a higher fatty acid soap which is the reaction product of a higher fatty acid and a soap-forming base. The higher fatty acid is saponified by the soap-forming base to provide sufficient higher fatty acid calculated as soap for gelating the emulsion. Suitable higher fatty acids are those containing 10 to 18 carbon atoms such as lauric, myristic, palmitic, stearic and oleic acids, and mixed fatty acids obtained from coconut, olive, palm, palm kernel and like fats and oils. Suitable soap-forming bases are inorganic bases such as alkali metal hydroxides, e.g. sodium or potassium hydroxide, or ammonia and organic bases such as amines, e.g. monoethanolamine, triethanolamine, isopropanolamine and the like.

Thus, the presence of the combination of the above-described ingredients provides a number of practical advantages including in particular an enhanced physical strength in emulsification and an increased gelation stability, thereby preventing any substantial amount of liquefication of the gel.

In the cleansing compositions of the instant invention, water is present in the range of about 40% to about 60% and preferably 45% to 52% by weight, based on the total weight of the composition.

Other substances may be added to the present composition for special effects provided the character of the product is not substantially adversely affected. Thus, emollients and skin conditioners such as lanolin and lanolin derivatives, e.g. ethoxylated lanolins, propylene glycol and glycerine, germicides and bactericides, dyes, pigments, perfumes, abrasives and preservatives may be employed. Ordinarily the amount of any of these additives will be very small, e.g. about 1% or less, and in no case may it prevent the formation of a stable, gelated oil-in-water emulsion.

In combining the above-described materials of the present invention, the proportions of the components are controlled in order to provide the stable gelated oil-in-water emulsion cleansing product. The aliphatic oxyethylated alcohol is used in concentrations ranging from about 5% to 15%, and preferably 7 to 10%, by weight. The hydrophilic-hydrophobic polyoxyalkylene polyoxypropylene glycol is employed in concentrations ranging from about 0.1% to 10.0%, and preferably 0.4 to 1.0%, by weight. The odorless mineral spirits is present in amounts ranging from about 20% to 50% and preferably about 32% to 38% by weight. The water is present in amounts ranging from about 40% to 60% and preferably about 45% to 52% by weight. The higher fatty acid is utilized in amounts ranging from about 3% to 10% and preferably 3% to 5% by weight, and the soap-forming base is utilized in amounts ranging from about 0.3% to 3% and preferably about 0.3% to 1% by weight; the molar ratio of the higher fatty acid saponified by the base is usually about 1:1 to provide the amount of soap for gelation, but an excess of either may be employed consistent with obtention of a product having the desired pH from about 7 to 9. The higher fatty acid calculated as soap present in the compositions is from about 3 to 14% and preferably about 3 to 6%.

Although satisfactory compositions can be formed by bringing the several components of the composition together in accordance with a variety of procedures, the presently preferred technique is the following procedure. The water phase of which the water forms the continuous phase of the oil-in-water emulsion is prepared by starting with water at an elevated temperature, i.e. a temperature between 90° F. and 140° F., preferably 110–120° F., and adding thereto the soap-forming base, and the two types of aliphatic non-ionic materials with gentle stirring (avoiding excessive aeration) until a clear solution is obtained. Where applicable the non-ionic materials are melted before addition to the water. The oil phase of which the oil component forms the discontinuous phase of the oil-in-water emulsion is prepared in a separate vessel by adding the soap-forming higher fatty acid to the odorless mineral spirits (or mixture of odorless mineral spirits and mineral oil) at room temperature. The oil phase is thereafter added to the water phase with continued agitation at the elevated temperature, i.e. between 90° and 140° F. and preferably about 110° to 120° F., until a fluid oil-in-water emulsion is obtained. On cooling to room temperature, a stable, gelated oil-in-water emulsion is formed during the cooling, usually within a few minutes. Of the optional additives or compounds, the perfumes and emolients are added to the oil phase and the other compounds are added to the water phase.

In packaging the product, the warm and fluid oil-in-water emulsion can be poured into tubes, cans, jars or other containers and allowed to cool whereupon the gelated product is formed. If desired, the gelated composition may be placed in containers by the use of pressure pumps.

To use the present preferred compositions most efficiently, one first conveniently applies a small amount of the gel to the object to be cleaned and rubs. In cleansing the hands or skin, the heat of the body and the frictional heat and mechanical working all coact to promote liquefaction of the gel and improved liquid-epidermis contact. After cleaning the contacted area, the grease and grime are either wiped off or washed off with water. Preferably, when the compositions of the present invention are used to clean inanimate objects such as whitewall tires, walls, spots on clothing and the like they are washed off with water.

The following examples are given to illustrate the present invention. They are not to be regarded as limiting the scope of the invention. All amounts and percentages given in the specification and claims are by weight unless otherwise indicated.

*Example I*

A stable, gelated oil-in-water emulsion cleansing composition is prepared having the following formulation:

| | Parts by wt. |
|---|---|
| Sodium hydroxide (40% AI) | 1.2 |
| Condensation product of mixed aliphatic alcohols ($C_{12}$–$C_{20}$) with 9 mols of ethylene oxide [1] | 8.5 |
| Compound E of Table I [2] | 0.5 |
| Odorless mineral spirits (commercial) [3] | 33.5 |
| Oleic acid | 3.8 |
| Lanolin | 1.0 |
| Water (with small amount of perfume, dye, etc.) | Bal. |
| | 100.0 |

[1] Condensate contains a mixture of saturated, straight chain aliphatic alcohols of essentially 14 to 18 carbon atoms such as having an approximate distribution (by weight) of: 3% max. $C_{12}$, about 37% $C_{14}$, about 37% $C_{16}$, about 21% $C_{18}$, and 2% max. $C_{20}$, and an average of about 9 ethylene oxide groups per molecule.
[2] Typical molecular weight of ($C_3H_6O$) group is 3250 and 30% ($C_2H_4O$) groups.
[3] Distillation range between 340° F. and 410° F.

This cleansing composition is prepared from a water phase and an oil phase according to the following.

| Water phase: | Parts by wt. |
|---|---|
| Water | 51.0 |
| Sodium hydroxide (40% AI) | 1.2 |
| Condensation product of aliphatic alcohols with 9 mols of ethylene oxide | 8.5 |
| Compound E | 0.5 |

The water is heated from room temperature to about 110–120° F. and the sodium hydroxide, and melted aliphatic alcohol-ethylene oxide condensate and Compound E are added thereto with gentle stirring.

| Oil phase: | Parts by wt. |
|---|---|
| Odorless mineral spirits | 33.50 |
| Oleic acid | 3.80 |

The oleic acid is added to the odorless mineral spirits at room temperature with gentle stirring.

Thereafter, the oil phase is added to the water phase at a temperature of about 110°–120° F. with agitation after which it is poured into wide-mouth jars. The mixture is gelled by cooling and the gel has a smooth consistency and attractive appearance. Upon rubbing on the hands it becomes fluid and coats the skin. The grease and grime are loosened and are wiped off (or, if preferred, washed off with water) and the hands are very well cleaned and have a very satisfactory soft smooth feel.

The pH of this product is 8.2. After being exposed to the atmosphere for 3 days at room temperature, this product has no free liquid. After storage at room temperature for 6 months, the product has no free liquid. After 5 days at 120° F., this product has no free liquid.

*Examples II–III*

Stable gelated oil-in-water emulsion cleansing compositions are prepared in a manner similar to Example I and have the following formulations:

| Ingredient | Parts by Weight | |
|---|---|---|
| | II | III |
| Isopropanolamine (commercial) | 2.0 | 2.0 |
| Condensation product of mixed aliphatic fatty alcohols with 9 mols of ethylene oxide of Example I | 8.5 | 8.5 |
| Compound E of Example I | 0.5 | 0.5 |
| Odorless mineral spirits of Example I | 32.8 | 37.8 |
| Oleic Acid | 4.3 | 4.0 |
| Lanolin | 1.0 | 1.0 |
| Water (with small amount of perfume, dye, etc.) | Balance | Balance |
| | 100.0 | 100.0 |
| pH | 8.0 | 8.0 |
| Free Liquid after 8 days at 130° F | None | None |

*Examples IV–VI*

Other suitable cleansing compositions prepared in accordance with the procedure of Example I have the following formulations:

| Ingredient | Parts by Weight | | |
|---|---|---|---|
| | IV | V | VI |
| Sodium Hydroxide (40% AI) | 0.95 | | |
| Sodium Hydroxide (50% AI) | | 1.1 | 1.1 |
| Condensation product of mixed aliphatic alcohols with 9 mols ethylene oxide of Example I | 8.50 | 8.5 | 8.5 |
| Compound E of Example I | 0.50 | 0.5 | 0.5 |
| Odorless mineral spirits of Example I | 33.20 | 32.8 | 22.8 |
| Mineral Oil | | | 10.0 |
| Red Oil (Oleic Acid) | 3.80 | 2.3 | 4.3 |
| Stearic Acid (double pressed) | | 2.0 | |
| Lanolin | 1.00 | 1.0 | 1.0 |
| Water (with small amount of perfume, dye, etc.) | Balance | Balance | Balance |
| | 100.00 | 100.0 | 100.0 |
| pH | 7.9 | 8.0 | 8.2 |
| Free liquid after 2 days in open air at room temperature | None | None | None |
| Free liquid after 6 months at room temperature | None | None | None |

*Examples VII–IX*

Suitable stable, gelated oil-in-water emulsion cleansing compositions containing Compounds A, F and G of Table I have the following formulations:

| Ingredients | Parts by Weight | | |
|---|---|---|---|
| | VII | VIII | IX |
| Water | 51.5 | 51.5 | 49.3 |
| Sodium Hydroxide (40% AI) | 1.4 | 1.4 | |
| Sodium Hydroxide (50% AI) | | | 1.1 |
| Condensation product of mixed aliphatic alcohols with 9 mols of ethylene oxide of Example I | 8.5 | 8.5 | 8.5 |
| Compound F of Table I [1] | 0.5 | | |
| Compound G of Table I [2] | | 0.5 | |
| Compound A of Table I [3] | | | 3.0 |
| Odorless Mineral Spirits of Example I | 32.8 | 32.8 | 32.8 |
| Oleic Acid | 4.3 | 4.3 | 4.3 |
| Lanolin | 1.0 | 1.0 | 1.0 |
| | 100.0 | 100.0 | 100.0 |

[1] Typical molecular weight of $(C_3H_6O)$ group is 3,250 and 40% $(C_2H_4O)$ groups.
[2] Typical molecular weight of $(C_3H_6O)$ group is 3,250 and 50% $(C_2H_4O)$ groups.
[3] Typical molecular weight of $(C_3H_6O)$ group is 1,750 and 40% $(C_2H_4O)$ groups.

These products become fluid and coat the skin when rubbed on the hands and the hands are well cleaned after the products are wiped off.

*Examples X–XII*

Other stable gelated oil-in-water emulsion cleansing compositions prepared in a manner similar to Example I have the following formulations:

| Ingredients | Parts by Weight | | |
|---|---|---|---|
| | X | XI | XII |
| Water | 44.2 | 43.7 | 42.4 |
| Sodium hydroxide (50% AI) | 3.0 | 1.1 | 1.1 |
| Condensation product of mixed aliphatic fatty alcohols with 9 mols of ethylene oxide of Example I | 8.5 | 5.0 | 15.0 |
| Compound E of Example I | 0.5 | 0.5 | 0.5 |
| Odorless mineral spirits of Example I | 32.8 | 43.7 | 35.0 |
| Oleic Acid | | 5.0 | 5.0 |
| Coconut fatty acid | 10.0 | | |
| Lanolin | 1.0 | 1.0 | 1.0 |
| | 100.0 | 100.0 | 100.0 |
| pH | 8.3 | 8.6 | 8.1 |
| Free liquid after 24 hours in open air at room temperature | None | None | None |

The compositions of the present invention have unusual stability to heat, cold, vibration, aging, open air exposure and other conditions which tend to destabilize gelated emulsions without any significant free liquid formation. However, in use as a cleanser on the skin they revert quickly to a liquid state so that they remove dirt, grime, grease and oil from the skin without the need of additional water other than that which is in the compositions. Additionally, the formulations can be easily removed without redeposition of foreign material on the skin, and the skin is left clean, dry, soft and smooth.

Numerous variations and modifications of the embodiments of this invention can be made without departing from its spirit or scope. Accordingly, the invention is not to be restricted to the specific embodiments set forth herein except as defined in the appended claims.

What is claimed is:

1. A stable gelated oil-in-water emulsion cleansing composition consisting essentially of by weight of the composition about 20% to about 50% of odorless mineral spirits, about 40% to about 60% of water, about 5% to about 15% of a condensate of an aliphatic alcohol with about 4 to 12 mols of ethylene oxide, said aliphatic alcohol containing from about 12 to 20 carbon atoms, about 0.1% to about 10% of a hydrophilic-hydrophobic polyoxyalkylene polyoxypropylene glycol of the formula $$HO(C_2H_4O)_m(C_3H_6O)_n(C_2H_4O)_m \cdot H$$

in which $m$ and $n$ are numbers whose value is such that the molecular weight of the group $(C_3H_6O)_n$ is from the range of 1,750 to 3,500 and $(C_2H_4O)_m$ equals 20% to 50% of the total weight of the compound and about 3% to 14% of higher fatty acid calculated as soap sufficient to gel the ingredients, said ingredients being proportioned to form a stable gelated oil-in-water emulsion having a pH from about 7 to about 9.

2. A stable gelated oil-in-water emulsion cleansing composition consisting essentially of by weight of the composition about 20% to about 50% of odorless mineral spirits, about 40% to about 60% of water, about 5% to about 15% of a condensate of an aliphatic alcohol with about 4 to 12 mols of ethylene oxide, said aliphatic alcohol containing from about 14 to 18 carbon atoms, about 0.1% to about 10% of a hydrophilic-hydrophobic polyoxyalkylene polyoxypropylene glycol of the formula $$HO(C_2H_4O)_m(C_3H_6O)_n(C_2H_4O)_m \cdot H$$

in which $m$ and $n$ are numbers whose value is such that the molecular weight of the group $(C_3H_6O)_n$ is from the range of 1,750 to 3,500 and $(C_2H_4O)_m$ equals 20% to 50% of the total weight of the compound and about 3% to 14% of a higher fatty acid calculated as soap sufficient to gel the ingredients, said ingredients being proportioned to form a stable gelated oil-in-water emulsion having a pH from about 7.8 to about 8.3.

3. A stable gelated oil-in-water emulsion cleansing composition consisting essentially of by weight of the composition about 32% to about 38% of odorless mineral spirits having a distillation range from about 340° to about 410° F., about 45% to about 52% of water, about 7% to about 10% of a condensate of a mixture of straight chain aliphatic alcohols having essentially 14 to 18 carbon atoms with an average of about 8 to 10 mols of ethylene oxide, about 0.4% to 1% of a hydrophilic-hydrophobic polyoxyalkylene polyoxypropylene glycol of the formula $$HO(C_2H_4O)_m(C_3H_6O)_n(C_2H_4O)_m \cdot H$$

in which $m$ and $n$ are numbers whose value is such that the molecular weight of the group $(C_3H_6O)_n$ is from the range of 2,300 to 3,500 and $(C_2H_4O)_m$ equals 30% to 50% and about 3% to 6% of a higher fatty acid calculated as soap sufficient to gel the ingredients, said ingredients being proportioned to form a stable gelated oil-in-water emulsion having a pH from about 7.8 to about 8.3.

4. A stable gelated oil-in-water emulsion cleansing composition consisting essentially of by weight of the composition about 32% to 38% of odorless mineral spirits having a distillation range from about 340° F. to 410° F., about 45% to 52% of water, about 7 to 10% of a condensate of a mixture of straight chain aliphatic alcohols having essentially 14 to 18 carbon atoms with an average of about 8 to 10 mols of ethylene oxide, about 0.4% to 1% of a hydrophilic-hydrophobic polyoxyalkylene polyoxypropylene glycol of the formula $$HO(C_2H_4O)_m(C_3H_6O)_n(C_2H_4O)_m \cdot H$$

in which $m$ and $n$ are numbers whose value is such that the molecular weight of the group $(C_3H_6O)_n$ is from the range of 2,300 to 3,500 and $(C_2H_4O)_m$ equals 30% to 50%, and about 3% to 6% of oleic acid calculated as sodium oleate sufficient to gel the ingredients, said ingredients being proportioned to form a stable gelated oil-in-water emulsion having a pH from about 7.8 to about 8.3.

5. A method for making a stable cleansing composition in gelated, oil-in-water emulsion form which comprises mixing about 45 parts to 60 parts of water, 5 parts to 15 parts of a condensate of an aliphatic alcohol with about 4 to 12 mols of ethylene oxide, said aliphatic alcohol containing from 12 to 20 carbon atoms, 0.1 part to 10 parts of a hydrophilic-hydrophobic polyoxyalkylene polyoxypropylene glycol of the formula $$HO(C_2H_4O)_m(C_3H_6O)_n(C_2H_4O)_m.H$$

in which $m$ and $n$ are numbers whose value is such that the molecular weight of the group $(C_3H_6O)_n$ is from the range of 1,750 to 3,500 and $(C_2H_4O)_m$ equals 20% to 50% of the total weight of the compound, and 0.3 part to 3 parts of a soap-forming base at elevated temperature between 90° F. and 140° F., agitating the mixture, adding thereto subsequently with the continued application of heat between said 90° F. and 140° F. and agitation about 20 parts to 50 parts of odorless mineral spirits and 3 parts to 10 parts of a higher fatty acid containing 10 to 18 carbon atoms until a fluid oil-in-water emulsion is formed, and lowering the temperature of said emulsion to room temperature whereby a gelated oil-in-water emulsion is formed.

References Cited by the Examiner

UNITED STATES PATENTS

| | | | |
|---|---|---|---|
| 2,920,045 | 1/1960 | Hearn et al. | 252—137 |
| 3,156,655 | 11/1964 | Bright | 252—109 |

OTHER REFERENCES

Soap and Chemical Specialties, Products and Processes (April 1963) (page 133 relied on).

Waterless Hand Cleaners, Soap and Sanitary Chemicals (April 1948), Lesser (pages 48–50 and 181 relied on).

LEON D. ROSDOL, *Primary Examiner.*

JULIUS GREENWALD, *Examiner.*

J. T. FEDIGAN, *Assistant Examiner.*